United States Patent
Akervall et al.

(10) Patent No.: US 6,356,428 B1
(45) Date of Patent: Mar. 12, 2002

(54) SUSPENSION DEVICE FOR LINE-MOUNTED SURGE ARRESTER

(75) Inventors: Sven Akervall; Roger Siljeholm, both of Ludvika (SE)

(73) Assignee: Abb AB, Vasteras (SE)

( * ) Notice: Subject to any disclaimer, the term of this patent is extended or adjusted under 35 U.S.C. 154(b) by 0 days.

(21) Appl. No.: 09/623,512
(22) PCT Filed: Mar. 30, 1999
(86) PCT No.: PCT/SE99/00494
§ 371 Date: Dec. 29, 2000
§ 102(e) Date: Dec. 29, 2000
(87) PCT Pub. No.: WO99/50942
PCT Pub. Date: Oct. 7, 1999

(30) Foreign Application Priority Data

Apr. 1, 1998 (SE) .............................................. 9801147

(51) Int. Cl.[7] .............................. H02H 9/04; H02B 5/02
(52) U.S. Cl. ........................ 361/132; 361/117; 361/127
(58) Field of Search ................. 361/117–120, 126–127, 361/137–138, 134, 125, 131–132

(56) References Cited

U.S. PATENT DOCUMENTS

| | | | | |
|---|---|---|---|---|
| 3,072,828 A | * | 1/1963 | Goffaux ....................... 361/131 |
| 5,237,482 A | * | 8/1993 | Osterhout et al. ........... 361/117 |
| 5,991,141 A | * | 11/1999 | Mikli et al. .................. 361/127 |
| 6,002,571 A | * | 12/1999 | Joulie et al. ................. 361/117 |

* cited by examiner

Primary Examiner—Josie Ballato
Assistant Examiner—Kim Huynh
(74) Attorney, Agent, or Firm—Oblon, Spivak, McClelland, Maier & Neustadt, P.C.

(57) ABSTRACT

A suspension device for a line arrester in an air-insulated transmission line including two suspension parts which support the line arrester such that its longitudinal axis deviates from the vertical line. One of the suspension parts includes a disconnecting device which, when releasing, permits the line arrester a swinging motion under the influence of a force of gravity caused by the weight of the line arrester itself. And, one of the suspension parts includes a damping member which influences the line arrester with a force directed against the swinging motion during at least part of the swinging motion. The damping member may include a damping plate, one or more friction linings, or a flexible wire.

10 Claims, 3 Drawing Sheets

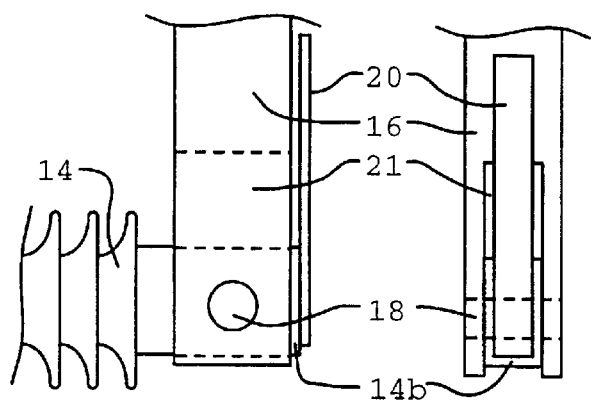
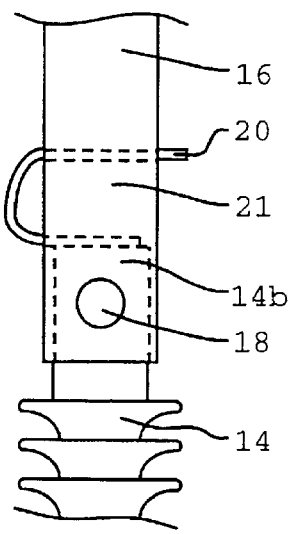
Fig. 2a
Fig. 2b
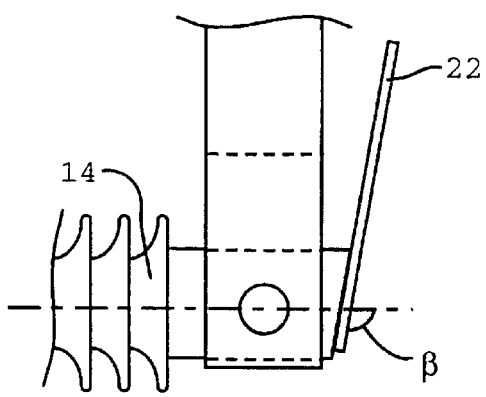
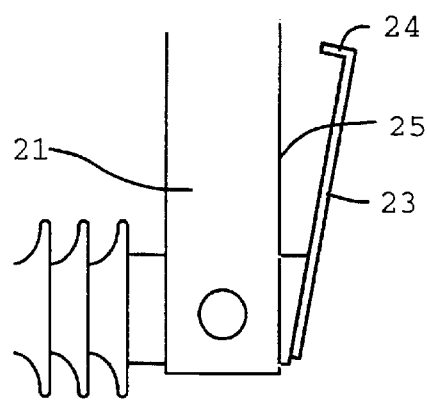
Fig. 2c
Fig. 2d
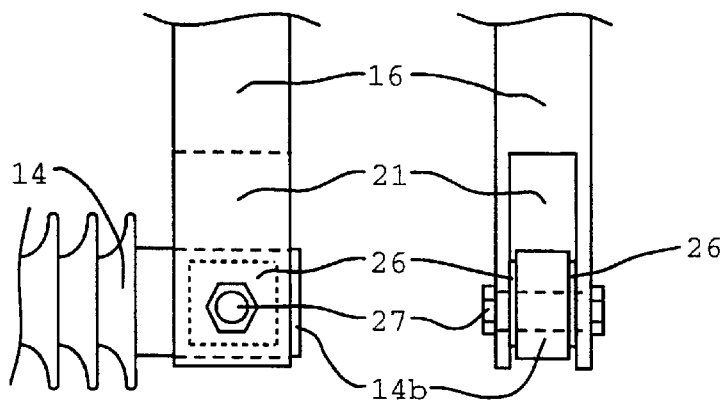
Fig. 3

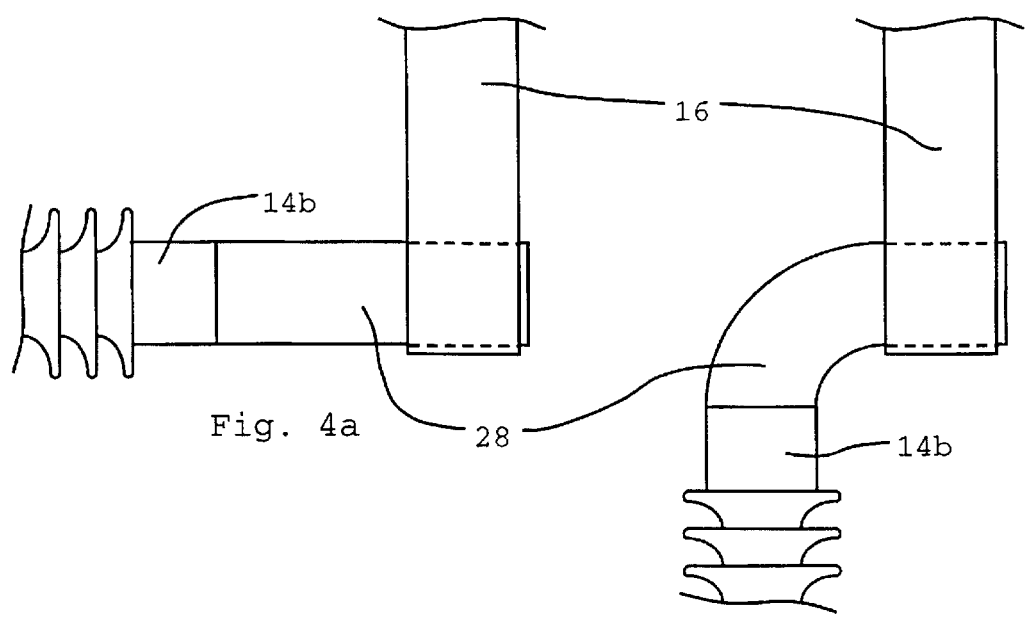
Fig. 4a
Fig. 4b
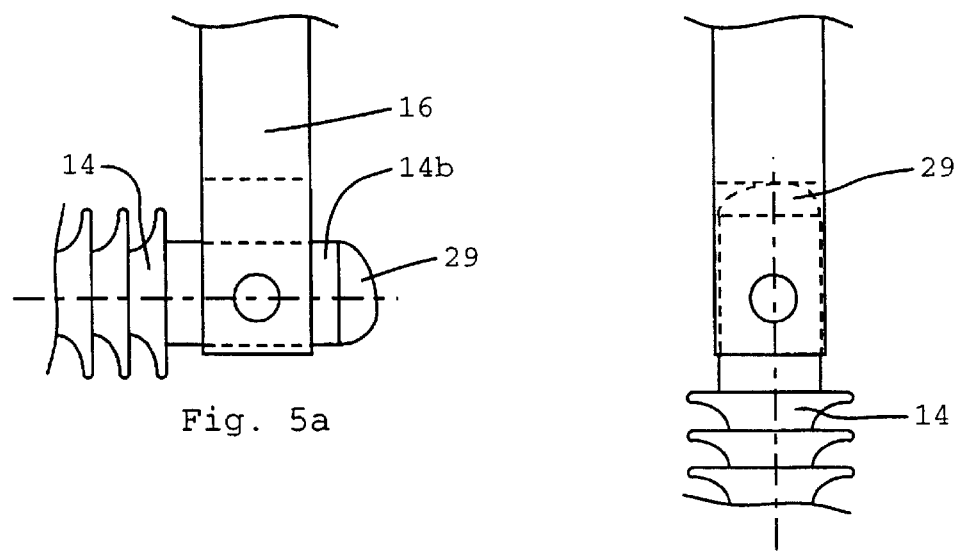
Fig. 5a
Fig. 5b

SUSPENSION DEVICE FOR LINE-MOUNTED SURGE ARRESTER

BACKGROUND OF THE INVENTION

1. Field of the Invention

The present invention relates to a suspension device for line-mounted surge arresters (hereinafter referred to as line arresters) for use in air-insulated power transmission lines in high-voltage transmission or distribution networks, that is, in electrical power systems with voltages from a few kilovolts up to several hundred kilovolts. The present invention also relates to a method in and use of such a suspension devices for line arresters.

2. Discussion of the Background

Line arresters are a type of arresters which are used for preventing overvoltages, such as switching overvoltages or overvoltages caused by lightning strokes, from propagating in air-insulated transmission lines. If it reaches a switchgear installation, an overvoltage may damage electrical apparatus or force circuit breakers to trip and thus destroy parts of the electrical power system. To prevent this, line arresters are connected, at regular intervals, to the conductors of the transmission line.

A surge arrester exhibits a non-linear current-voltage characteristic in that its conductivity increases non-linearly with the voltage. A modern surge arrester comprises series-connected blocks of substantially zinc oxide which are enclosed in a porcelain or polymer insulator. At normal voltages across the blocks, their conductivity is practically zero, but at high voltages the blocks become electrically conductive.

The line arrester owes its name to the fact that it is connected to the electrical power system out on the line, that is, in the transmission line. The line arrester has an elongated shape and is connected at one end to one of the conductors of the transmission line and at its other end to ground potential. The voltage across the line arrester is thus equal to phase voltage. At normal phase voltage, the conductivity of the line arrester is, in principle, zero, but when an overvoltage arises on the line, the line arrester becomes conductive and the overvoltage is conducted to ground. An overvoltage is thus prevented from propagating further in the transmission line. When the voltage of the conductor again drops to normal level, the conductivity of the line arrester returns to zero.

Admittedly, a line arrester is dimensioned to handle overvoltages but it does not withstand any amount of overvoltages. There is a risk that the line arrester, after an overload, that is, a voltage load which is higher than that for which the line arrester is designed, will have a current-voltage characteristic which deviates from the original one. It is possible, for example, that the line arrester continues to be electrically conductive after the voltage across it has returned to normal level. To prevent the line arrester from disturbing the electrical power system, it is therefore important that it is disconnected as rapidly as possible from the transmission line after an overload. After the line arrester has become overloaded, it is expended and must be replaced.

In an air-insulated transmission line, the high-voltage conductors are supported, via insulators of porcelain or glass, by transmission towers. If line arresters are used in the transmission line, the arresters are connected to the conductors in the vicinity of these transmission towers. Each line arrester may then be grounded by being connected to the nearest tower. A condition for this to function is, of course, that the towers themselves are grounded and that they are made of steel or any other electrically conductive material. The line arrester is mounted at a transmission tower by means of a suspension device comprising a first and a second suspension part. Via the first suspension part, the first end of the line arrester, the high-voltage end, is connected to the high-voltage line, and via the second suspension part the second end of the line arrester, the ground end, is connected to the transmission tower. The high-voltage conductor is in electrical contact with ground potential, via the line arrester and the tower, and is thus parallel-connected to the insulator which insulates the high-voltage line from the transmission tower. At an overload of the line arrester, this contact must be broken. Some of the two suspension parts is, therefore, provided with a disconnecting device which is released at an overload and hence physically breaks the electrical contact between the high-voltage conductor and the transmission tower. One example of a frequently used disconnecting device is a blasting cap which explodes when subjected to high powers.

The location of the disconnecting device depends on how the line arrester is mounted at the transmission line. The line arrester may, for example, be mounted such that, via the first suspension part, it is suspended vertically from one of the conductors of the transmission line and is connected to the transmission tower via the second suspension device, which in this case consists of a ground line. In such a mounting arrangement, the disconnecting device is usually placed where the ground line is connected to the ground side of the line arrester. When the line arrester is overloaded, the connection of the high-voltage line to ground is broken by the disconnecting device being released, whereby the ground conductor, under the influence of its own weight, falls and remains hanging from the transmission tower.

However, the present invention deals with line arresters where, contrary to the example above, the longitudinal axis of the line arrester deviates from the vertical line when the line arresters are in operation. In such a mounting arrangement, the disconnecting device is placed in one of the two suspension parts, and in the other of the two suspension parts the line arrester is articulately attached. At an overload of the line arrester and a subsequent release of the disconnecting device, the line arrester, under the influence of its own weight, performs a rotating movement around that suspension part from which the line arrester is articulately suspended, whereby the line arrester swings back and forth past the vertical line before it finally adopts a vertical position. Because of the swinging motion, that suspension part, from which the line arrester is articulately suspended, will be subjected to such a mechanical load that it runs the risk of breaking, causing the line arrester to fall to the ground. Since the line arrester in most suspension arrangements is suspended in the vicinity of an insulator and a transmission tower, these parts run the risk of being hit by the swinging line arrester if the amplitude of the swinging motion is great. A powerfully swinging motion thus entails a risk of the line arrester damaging the insulator or the transmission tower. In addition, there is a risk that the line arrester itself is broken against the insulator or the transmission tower, whereby parts of the line arrester will fall to the ground.

SUMMARY OF THE INVENTION

The object of the presents invention is to provide a suspension device for line arresters in which the above-mentioned disadvantages of a swinging line arrester are avoided by controlling and damping the motion of the line arrester. This is achieved according to the invention with a suspension device comprising two suspension parts, in which one of the suspension parts comprises a damping member which, when the disconnecting device is released, influences the line arrester with a force which is directed against the swinging motion and which damps the motion during at least part of the motion, whereby the kinetic energy which the line arrester possesses is transformed into thermal energy in the damping member or on the surface thereof. In this process the damping member may be allowed to be deformed plastically or elastically.

In most suspension arrangements, the line arrester may be allowed to swing with an amplitude which deviates 15° from the vertical line without a risk of the line arrester hitting a transmission tower or an insulator. The damping member should therefore be dimensioned such that the turn angle, that is the angle between the vertical line and the line arrester when it turns in its movement, is not larger than 15°. Preferably, however, the damping member is dimensioned such that the turn angle is not larger than 5° to prevent the load on that suspension part, on which the line arrester rotates, from becoming too great.

For each line arrester, the damping force, and hence the damping member, must be adapted to the weight and the length of the line arrester and to the angle between the longitudinal axis of the line arrester and the vertical line during normal operation, that is, the initial position of the line arrester. The damping member must also be adapted to the maximum permissible turn angle permitted by the suspension arrangement.

BRIEF DESCRIPTION OF THE DRAWINGS

The invention will be described in greater detail in the following with reference to the accompanying drawings, wherein FIGS. 2a–2d show a first preferred embodiment of a damping member included in a suspension device according to the invention, FIG. 3 shows a second preferred embodiment of a damping member included in a suspension device according to the invention, FIGS. 4a–4b show a third preferred embodiment of a damping member included in a suspension device according to the invention, and FIGS. 5a–5b show a fourth embodiment of a damping member included in a suspension device according to the invention.

DESCRIPTION OF THE PREFERRED EMBODIMENTS

Figure 1:
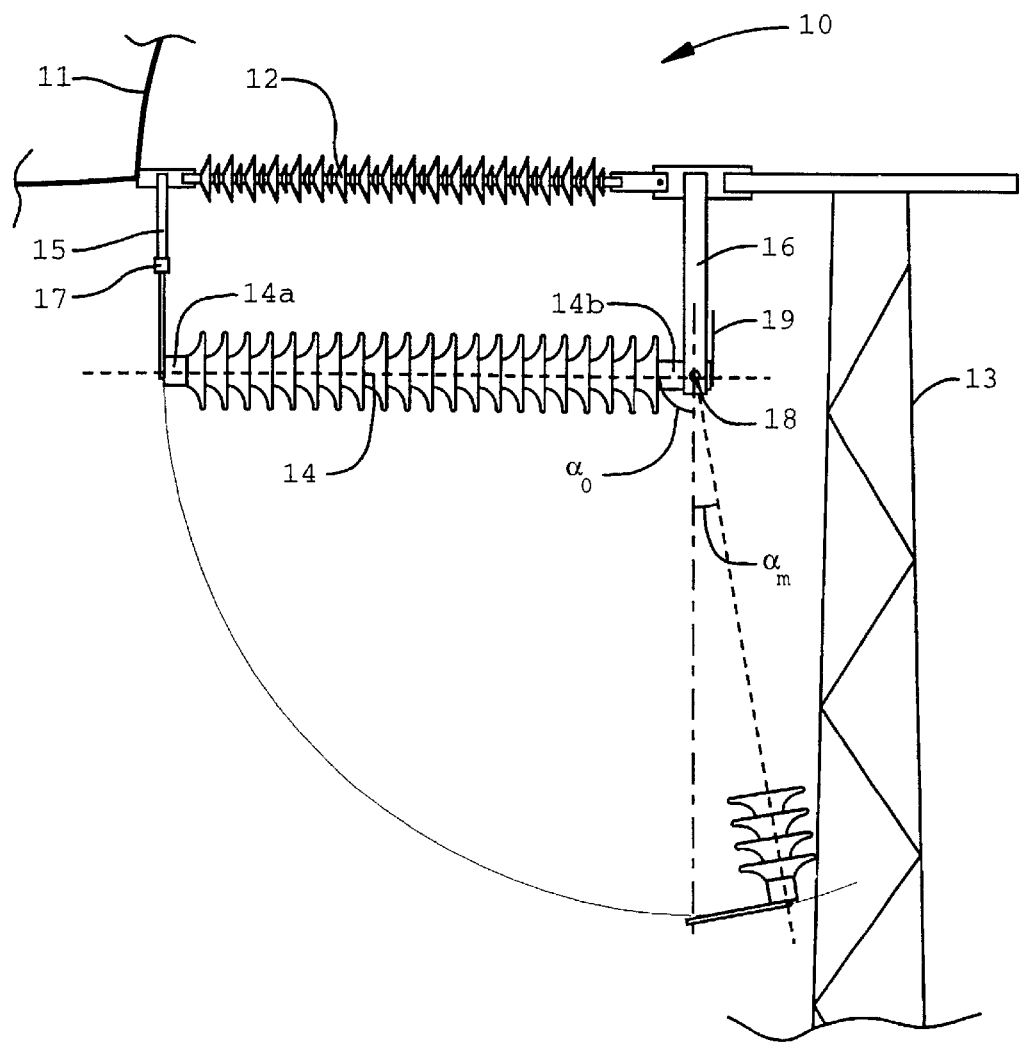
FIG. 1 shows a partial view of a transmission line in which a suspension device according to the invention is mounted.

FIG. 1 shows a partial view of an air-insulated transmission line 10. The transmission line 10 comprises a transmission tower 13 which supports a high-voltage line 11. The high-voltage line 11, which is energized, is electrically insulated, via an insulator 12, from the transmission tower 13 which has ground potential. In the transmission line 10, a line arrester 14 is arranged. It may adopt two positions; an active position where the line arrester is situated during normal operation, and an in-active position where the line arrester 14 ends up after an overload. When the line arrester 14 is in its active position, its longitudinal axis deviates by an angle $\alpha_0$ from the vertical line. The vertical line is marked by a dash-dotted line in the figure. In its active position, the first end 14a of the line arrester is attached, via a first suspension part 15, to the high-voltage line 11, and, via a second suspension part 16, the second end 14b of the line arrester is attached to the transmission tower 13. The second end 14b of the line arrester is rotatably arranged at the second suspension part 16 at an attachment point 18. The line arrester 14 is electrically connected to the high-voltage line 11 through the first suspension part 15 and electrically connected to the transmission tower 13, that is ground potential, through the second suspension part 16. In its active position, the line arrester 14 is connected in parallel with the insulator 12 and carries overvoltages which arise on the high-voltage line 11 to ground via the transmission tower 13, as previously described under the background art.

In case of an overload of the line arrester 14, a disconnecting device 17, which is arranged in the first suspension device 15, is released and disconnects the first end 14a of the line arrester from the high-voltage line 11. The line arrester 14 thereby rotates in a counterclockwise direction in the figure around the attachment point 18 under the influence of a force of gravity caused by the weight of the line arrester 14 itself. A damping member 19 arranged in the second suspension part 16 influences the line arrester 14 with a force directed against the movement, which force, depending on the design of the damping member 19, may influence the line arrester 14 during the whole of, or during parts of, the swinging motion of the line arrester 14. The line arrester 14 performs an oscillating movement in that it initially rotates in a counterclockwise direction in the figure, passes the vertical line, reaches a first turning position, and then rotates in a clockwise direction in the figure, passes the vertical line again, whereupon the line arrester 14 reaches a second turning position, and then repeats the oscillating movement. Under the influence of the force directed against the movement, the line arrester 14 swings with an increasingly smaller amplitude and then successively settles smoothly in its inactive position, suspended vertically from the second suspension part 16. The damping member ensures that the second suspension part 16 is not subjected to harmful forces. The magnitude of the force directed against the movement determines where the line arrester 14 turns in its swinging motion and how fast the swinging motion is damped. The damping member is adapted such that the line arrester 14 does not, under any circumstances, strike the transmission tower 13, that is, the first turn angle is never greater than $\alpha_m$ which is defined by the angle between the line arrester 14 and the vertical line where the line arrester 14 strikes the transmission tower 13.

In the above example, the disconnecting device is placed in the first suspension part, that is, in that part which is connected to the high-voltage line, whereas the damping member is arranged in the second suspension part, which is connected to ground potential. However, it is possible, within the scope of the invention, to place the disconnecting device in the second suspension part and the damping member in the first suspension part. The distance to the transmission tower then becomes greater than in the above example, but at the same time the load on the first suspension part becomes greater than the load on the second suspension device in the example above since the first suspension device is further away from the fixed point where the insulator is clamped to the transmission tower than the second suspension part.

FIGS. 2a, 2b, 2c and 2d show a first preferred embodiment of a damping member included in a suspension device according to the invention where the damping member consists of a damping plate 20, 22, 23. FIG. 2a shows two views of the line arrester 14 when it is in its active position, and FIG. 2b shows the line arrester 14 when it is in its inactive position, as described in connection with FIG. 1. The damping member comprises a damping plate 20 which is attached to the second end 14b of the line arrester at right angles to the longitudinal axis of the line arrester 14. When the line arrester 14, in connection with an overload and a subsequent release of the disconnecting device, rotates around its attachment point 18, the damping plate 20 is forced into a recess 21 in the second suspension part 16 and is folded in two. In connection with the damping plate 20 becoming deformed elastically and plastically and sliding towards the inner wall of the recess 21, the damping plate 20 influences the line arrester 14 with a damping force which counteracts the rotating movement performed by the line arrester 14 under the influence of a force of gravity caused by the weight of the line arrester 14 itself. The dimensions and material of the damping plate 20 and the dimensions of the recess 21 may be adapted such that the desired damping force is achieved. In this connection, the weight and the length of the line arrester 14 as well as the angle with respect to the vertical line that the line arrester 14 has in its active position and the distance to the transmission tower must be taken into consideration.

As the damping plate 20 is arranged in FIG. 2a, the damping plate 20 will influence the line arrester 14 with a damping force shortly after the line arrester 14 has started rotating. Since, in case of an overload of the line arrester, it is desirable to rapidly break the electrical contact between the high-voltage conductor and the transmission tower, it may be desirable that the rotating movement of the line arrester 14 is not damped at the beginning of the movement. FIG. 2c shows a damping plate 22 which is attached to the line arrester 14 such that the damping plate 22 influences the line arrester 14 with a damping force only when the line arrester 14 has rotated a certain distance from its active position. This is achieved by arranging the damping plate 22 at an angle β with the longitudinal axis of the line arrester 14 exceeding 90°. By choosing different angles β, the damping plate 22 may be caused to influence the line arrester 14 with a damping force to different extent into the rotating movement of the line arrester 14.

With knowledge of the length and weight of the line arrester 14, the damping plates 20, 22, in FIGS. 2a, 2b and 2c described above, may be dimensioned such that the greatest permissible turn angle $\alpha_m$ is not exceeded. If a snow or ice covering occurs on the line arrester 14, however, the weight of the line arrester 14 is changed and there is a risk that the maximum permissible turn angle $\alpha_m$ is exceeded. FIG. 2d shows a damping plate 23, the end of which exhibits a bend 24 at right angles, in a counter-clockwise direction in the figure, to the longitudinal axis of the damping plate 23. The bend 24 ensures that the line arrester 14 does not rotate past the vertical line further than the maximum permissible turn angle $\alpha_m$ when the bend 24 engages the upper edge 25 of the recess 21 when the turn angle $\alpha_m$ is achieved. For most mounting arrangements, the maximum permissible turn angle $\alpha_m$ is 15°. Preferably, however, the damping plate 23 should be dimensioned such that the maximum permissible turn angle $\alpha_m$ does not exceed 5°.

FIG. 3 shows two views of a second preferred embodiment of a damping member included in a suspension device according to the invention, where the damping member consists of two friction linings 26 which are fixed on the inside of the recess 21 in the second suspension part 16 such that they make contact with the second end 14b of the line arrester, whereby, when the line arrester 14 rotates around the second suspension part 16, they influence the line arrester 14 with a constant frictional force which counteracts the rotating movement of the line arrester 14 during the whole movement. The desired frictional force may be obtained by varying that area with which the friction linings 26 make contact with the second end 14b of the line arrester and by varying the force of application by varying the tightening force of the bolt/nut joint 27 which, furthermore, is the rotational joint around which the line arrester 14 rotates. The friction linings 26 may, of course, be combined with a damping plate described above with reference to FIGS. 2a–2d.

FIGS. 4a and 4b show a third preferred embodiment of a damping member included in a suspension device according to the invention, where the damping member consists of a flexible, electrically conductive wire 28, one end of which is fixed to the second end 14b of the line arrester. The second end of the wire 40 is rigidly attached to the second suspension part 16. The torsional rigidity of the wire 40 in its longitudinal direction is chosen such that the maximum permissible turn angle $\alpha_m$ is not exceeded.

FIGS. 5a and 5b show a fourth embodiment of the invention where the damping member is in the form of a disc cam 29 which is attached to the second end 14b of the line arrester. The disc cam 29 exhibits a convex surface which, when the line arrester is disconnected, is brought into contact with the second suspension part 16, whereby a frictional force arises between the disc cam 29 and the second suspension part 16. The disc cam 29 influences the line arrester 14 with a a force directed against the swinging motion while being deformed elastically or plastically. The kinetic energy of the line arrester changes into thermal energy in the disc cam 29 which, in the final phase of the movement, is wedged between the second suspension part 16 and the second end 14b of the line arrester. By forming the disc cam 29 of a suitable material and with a suitable geometry, the rotational movement of the line arrester 14 may be damped such that the line arrester 14 assumes the desired position. With this embodiment of the invention, the swinging motion of the line arrester may be damped before the line arrester reaches its vertical position and an oscillating movement of the line arrester may thus be completely avoided. An elastically deformable disc cam is suitably made from some polymer material, for example rubber, and a plastically deformable disc is suitably made of a metallic material.

What is claimed is:

1. A suspension device for a line arrester in an air-insulated transmission line comprising two suspension parts which support the line arrester such that its longitudinal axis deviates from the vertical line, wherein one of the suspension parts comprises a disconnecting device which, when releasing, permits the line arrester a swinging motion under the influence of a force of gravity caused by the weight of the line arrester itself, characterized in that one of the suspension parts comprises a damping member which influences the line arrester with a force directed against the swinging motion during at least part of the swinging motion.

2. A suspension device for a line arrester in an air-insulated transmission line according to claim 1, characterized in that the damping member during at least part of the swinging motion is deformed elastically or plastically.

3. A suspension device for a line arrester in an air-insulated transmission line according to claim 1 characterized in that the damping member comprises a damping plate.

4. A suspension device for a line arrester in an air-insulated transmission line according to claim 1 characterized in that the damping member comprises a disc cam.

5. A suspension device for a line arrester in an air-insulated transmission line according to claim 1 characterized in that the damping member comprises at least one friction lining.

6. A suspension device for a line arrester in an air-insulated transmission line according to claim 1 characterized in that the damping member comprises a flexible, electrically conductive wire.

7. A suspension device for a line arrester in an air-insulated transmission line according to claim 1 characterized in that the damping member influences the line arrester with a force directed against the swinging motion, such that the swinging motion does not extend past the vertical line more than 15°, and preferably not more than 5°.

8. Use of a suspension device for a line arrester according to claim 1 in a distributation network.

9. Use of a suspension device for a line arrester according to claim 1 in a distributation network.

10. A method for damping of a line arrester in an air-insulated transmission line having steps of:

supporting the line arrester with the two suspension parts such that its longitudinal axis deviates from the vertical line, wherein one of the suspension parts comprises a disconnecting device;

permitting the line arrester with a swinging motion under the influence of a force of gravity caused by the weight of the line arrester itself when releasing;

influencing the line arrester, by a damping member, by a force directed against the swinging motion during at least part of the motion; and arranging the damping member in one of the suspension parts.

* * * * *